Patented Sept. 16, 1941

2,256,187

UNITED STATES PATENT OFFICE 2,256,187

MINERAL OIL PRODUCT AND PROCESS OF TREATING THE SAME

Thomas W. Bartram, Nitro, W. Va., assignor, by mesne assignments, to Monsanto Chemical Company, Wilmington, Del., a corporation of Delaware No Drawing. Application July 17, 1935, Serial No. 31,882

12 Claims. (Cl. 44—9)

This invention relates to improvement in means for the protection of liquid hydrocarbon products against discoloration and formation of insoluble and gummy products. More particularly the present invention relates to improved materials for use with liquid hydrocarbons which may be used as fuels.

Liquid hydrocarbons as commercially produced, particularly when prepared by the distillation or cracking of petroleum, possess a tendency to discolor on standing and to form gums and resinous substances. Gasolines produced by the modern cracking processes are extremely complicated mixtures comprising many constituents, the character of these constituents and the relative proportions of the different constituents depending upon the source of the crude and the particular cracking process employed. Among other constituents, the crude cracked gasoline contains unsaturated hydrocarbons, such as for example the olefines and diolefines. The more recent pressure methods of vapor phase cracking result in a considerably higher percentage of diolefines than the older methods. It has thus become necessary to treat the crude products resulting from the more recent cracking processes in some manner to remove the greater part of these more highly unsaturated products. Among these methods of treatment may be mentioned the sulfuric acid treatment and the fuller's earth vapor phase treatment. While these methods of purification have certain advantages and may remove the greater part of the highly unsaturated compounds, it is still found that many petroleum distillates, for example gasoline and kerosene, become discolored and develop a quantity of gummy materials during storage.

This discoloration developed in gasoline, kerosene and the like is objectionable to consumers and distributors of these products and the presence of gummy material in gasoline causes such undesirable effects, when used in internal combustion engines as sticking of the valve stems and excessive carbon formation.

In accordance with this invention the development of these undesirable characteristics in petroleum products may be readily prevented or materially delayed without apparently increasing the cost of production thereof.

The present invention has for an object the inhibition of the formation of gums and resins in oil compositions.

Another object of the present invention is to provide a new mineral oil product possessing improved properties particularly for use as a fuel for internal combustion engines. The treating means and special compositions disclosed herein are likewise adaptable for use as a transformer oil, as a lubricating means, as a heat circulating medium and analogous uses wherein it is desirable that an improved and satisfactory stable mineral oil product be employed.

Another object of this invention is to provide a method of and means for preventing or materially decreasing the development of discoloration in petroleum distillate products.

Another object is to provide a method and means of the character referred to that will not appreciably increase the cost of production of petroleum products.

Other objects of the invention will be apparent from the following description.

The class of materials which have been found to possess the desirable qualities set forth in that small proportions thereof when incorporated in a relatively unstable oil product, for example gasoline and kerosene, materially increases the stability thereof, comprise a condensation product of a phosphorus halide and an organic hydroxyl containing compound. More particularly the preferred class of materials comprise esters of phosphorus acids.

Illustrative of the preferred class of materials and included within the scope of the present invention are the following products: triphenyl phosphate, obtainable by condensing phenol with phosphorus oxychloride; tri alpha naphthyl phosphite, obtainable by condensing alpha naphthol with phosphorus trichloride; tri ortho methylhydroquinone phosphite, obtainable by condensing ortho methylhydroquinone with phosphorus trichloride; pyrocatechol phosphite obtainable by condensing substantially three mols of pyrocatechol with substantially two mols of phosphorus trichloride; pyrocatechol phosphinyl chloride, obtainable by condensing substantially one mol of pyrocatechol with substantially one mol of phosphorus trichloride; condensation product of phosphorus trichloride and fusel oil and tricresyl phosphate, obtainable in a manner analogous to triphenyl phosphate.

In order to test the gum inhibiting properties of the preferred class of materials, the following procedure, which is essentially that described by E. B. Hunn, H. G. M. Fischer and A. J. Blackwood in the Society of Automotive Engineers Journal, vol. 26, #1 (1930), pages 32 and 33, was employed.

Into an Emerson Coal Calorimeter bomb having a capacity of 500 c. c., a small glass open vessel having a capacity of substantially 150 c. c. was placed, which contained 100 c. c. of an unstable gasoline, such as for example, a gasoline known as "Cracking Coil Distillate," to which had been added a small proportion of one of the preferred class of materials, which may be called "gum inhibitors." The lid was then placed tightly on the bomb. Substantially one hundred pounds pressure of oxygen was then introduced by means of a delivery tube, after which said delivery tube was closed by means of a suitable valve. The bomb was then connected by means of a delivery tube with a pressure gauge having a range between 0 to 200# and having an accurate scale from 100-150#, after which it was heated preferably by immersing it in a hot water bath maintained at 95° to 98° C. and maintained at said temperature so long as there was no appreciable drop in pressure as indicated by the pressure gauge. A drop in pressure indicates a reaction between the oxygen and the unstable portion of the gasoline. The period of time elapsing before this reaction takes place is indicative of the stability of the gasoline. As hereinafter employed, the period of stability is the time in minutes from the time of the immersion of the bomb in the bath maintained at a temperature of 97-98° C. until there is a drop in pressure on the pressure gauge of 5 pounds per square inch.

As one method of operating the present invention, one of the preferred materials, for example 30 mg. of pyrocatechol phosphite, was dissolved in 100 c. c. of unstable gasoline known as "Cracking Coil Distillate" and a test carried out as indicated above. The period of stability was 460 minutes.

A test carried out in a manner identical with that given above, with the exception that no "gum inhibitor" was added showed the gasoline had a period of stability of 70 minutes.

If convenient or desirable, if the inhibitor to be added to the unstable oil product, for example gasoline, is not readily soluble therein, it may be dissolved in a suitable solvent and the solution of the inhibitor thus prepared added thereto.

As further specific embodiments of the present invention, but not limitative of the scope thereof, small proportions of triphenyl phosphate, tri alpha naphthyl phosphite, tri ortho methylhydroquinone phosphite and pyrocatechol phosphinyl chloride were incorporated in an unstable gasoline, for example "cracking coil distillate" and found to increase the stability of the gasoline. The results obtained on testing the stabilizing action of the above materials in the manner hereinbefore set forth are given in the following table.

| Gum inhibitor | Weight of gum inhibitor added | "Cracking coil distillate" | Period of stability before pressure dropped 5 pounds per sq. in. |
|---|---|---|---|
| | Milligram | C. c. | |
| Triphenyl phosphate | 50 | 100 | 122 |
| Tri alpha naphthyl phosphite | 50 | 100 | 112 |
| Tri ortho methylhydroquinone phosphite | 50 | 100 | 120 |
| Pyrocatechol phosphinyl chloride | 30 | 100 | 155 |
| Blank | None | | 70 |

Included among other examples of the preferred class of materials that have been employed as stabilizers of unstable gasoline and the like and found to possess the gum inhibiting properties of the class are glyceryl phosphoric acid, reaction product of fusel oil and phosphorus trichloride, tricresyl phosphate and disodium glycerol phosphate.

From the data hereinbefore set forth it is shown that the preferred class of materials comprise an important class of stabilizers for use in oil products.

As a further specific embodiment of the present invention showing the action of the preferred class of materials as stabilizers against the deteriorating influence of light, 10 mgs. of pyrocatechol phosphite were dissolved in 100 c.c. of an unstable gasoline, for example a cracking coil distillate, and exposed to northern light for a period of about five months together with a sample of the same untreated gasoline. At the end of this period the two samples were compared in a suitable apparatus, and it was found that the gasoline containing the preferred stabilizer, for example pyrocatechol phosphite, was markedly superior as to color stability over the same untreated gasoline.

Other similar oil compositions designed for particular uses may be prepared in the manner described by merely substituting the desired oil fraction or cut and adding the necessary quantity of the gum inhibitor thereto. To produce the effect desired a quantity of inhibitor equal to from approximately 0.001 to 0.05% of the weight of the oil product is preferably employed.

Other ratios of the preferred class of materials than those hereinbefore set forth may be employed, also other methods of testing may be employed as is readily apparent to those skilled in the art to which this invention pertains.

What is claimed is:

1. A cracked petroleum distillate fuel unstable to oxidation containing a small proportion of an ester of a phosphorous acid.

2. A cracked petroleum distillate fuel unstable to oxidation containing a small proportion of an aromatic ester of a phosphorus acid.

3. A cracked petroleum distillate fuel unstable to oxidation containing a small proportion of an aromatic ester of phosphoric acid.

4. A cracked petroleum distillate fuel unstable to oxidation containing a small proportion of an aromatic ester of phosphorus acid.

5. Gasoline produced by the cracking of mineral oils to which has been added an ester of phosphorus acid.

6. Gasoline produced by the cracking of mineral oils to which has been added an aromatic ester of a phosphorus acid.

7. Gasoline produced by the cracking of mineral oils to which has been added a phenolic ester of a phosphorus acid.

8. Gasoline produced by the cracking of mineral oils to which has been added a pyrocatechol ester of phosphorus acid.

9. Gasoline produced by the cracking of mineral oils to which has been added pyrocatechol phosphite.

10. Gasoline produced by the cracking of mineral oils to which has been added a condensation product of substantially two mols of phosphorus trichloride and substantially three mols of pyrocatechol.

11. Gasoline produced by the cracking of mineral oils to which has been added pyrocatechol phosphinyl chloride.

12. A cracked gum forming gasoline containing a small quantity of tri phenyl phosphate.

THOMAS W. BARTRAM.